US006952056B2

(12) United States Patent
Brandenburg et al.

(10) Patent No.: US 6,952,056 B2
(45) Date of Patent: Oct. 4, 2005

(54) GENERATOR INCLUDING VERTICALLY SHAFTED ENGINE

(75) Inventors: Billy Brandenburg, Horicon, WI (US); Richard A. Hosig, Lake Mills, WI (US); Wesley A. Sodemann, Dousman, WI (US); Herbert Hoenisch, Waukesha, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 167 days.

(21) Appl. No.: 10/635,056

(22) Filed: Aug. 6, 2003

(65) Prior Publication Data

US 2005/0029815 A1 Feb. 10, 2005

(51) Int. Cl.[7] .............................. H02K 5/00; F01P 1/02
(52) U.S. Cl. ........................... 290/1 A; 290/2; 123/41.7
(58) Field of Search ................................ 290/1 R, 1 A, 290/2, 52; 123/41.7

(56) References Cited

U.S. PATENT DOCUMENTS

| | | | | |
|---|---|---|---|---|
| 4,243,893 A | | 1/1981 | Sten | |
| 4,540,888 A | | 9/1985 | Drewry et al. | |
| 4,548,164 A | * | 10/1985 | Ylonen et al. | 123/2 |
| 4,677,940 A | | 7/1987 | Bracht et al. | |
| 4,779,905 A | | 10/1988 | Ito et al. | |
| 4,856,470 A | | 8/1989 | Ishii et al. | |
| 4,859,886 A | | 8/1989 | Tanaka et al. | |
| 4,907,546 A | | 3/1990 | Ishii et al. | |
| 5,121,715 A | * | 6/1992 | Nogami et al. | 123/41.7 |
| 5,133,637 A | | 7/1992 | Wadsworth | |
| 5,433,175 A | | 7/1995 | Hughes et al. | |
| 5,515,816 A | | 5/1996 | Ball et al. | |
| 5,546,901 A | | 8/1996 | Acker et al. | |
| 5,626,105 A | | 5/1997 | Locke et al. | |
| 5,694,889 A | * | 12/1997 | Ball et al. | 123/41.7 |
| 5,890,460 A | * | 4/1999 | Ball et al. | 123/41.7 |
| 5,899,174 A | | 5/1999 | Anderson et al. | |
| 5,965,999 A | | 10/1999 | Frank | |
| D418,809 S | | 1/2000 | Frank | |

(Continued)

FOREIGN PATENT DOCUMENTS

| | | | |
|---|---|---|---|
| JP | 63056144 | | 3/1988 |
| JP | 5-312050 | * | 5/1992 |
| JP | 11082044 | | 3/1999 |

OTHER PUBLICATIONS

Campbell Hausfield Professional Products catalog SL181 dated Feb. 1997, p. 33.
GENERAC Corporation Owner's Manual for NP–30G Air-Cooled Recreational Vehicle Generator, Model 9557–0, dated Jun. 30 1993.
SEARS Owner's Manual for Portable Alternator 1250 Watt Manual Start, Model No. 580.323010, published prior to Aug. 6, 2002.
SEARS Owner's Manual for Portable Alternator 1250 Watt Manual Start, Model No. 580.323050, published prior to Aug. 6, 2002.

*Primary Examiner*—Nicholas Ponomarenko
(74) *Attorney, Agent, or Firm*—Michael Best & Friedrich, LLP

(57) ABSTRACT

A generator positionable on a support surface and including a frame, an internal combustion engine coupled to the frame, an electrical energy source, a fuel tank, and an output unit. The one-piece mounting member is coupled to the frame and has mounting arms that each provide a frame mount, an engine mount, and a source mount. The internal combustion engine is coupled to the mounting member and includes an output shaft that extends through a central portion and that is substantially normal to the support surface during generator operation. The electrical energy source has a rotor coupled to the output shaft for rotation therewith, and a stator coupled to the mounting member. The fuel supply supplies fuel to the engine, and the output unit communicates with at least one of the engine and the energy source.

5 Claims, 9 Drawing Sheets

U.S. PATENT DOCUMENTS 6,067,945 A 5/2000 Fukuda et al.
6,084,313 A 7/2000 Frank
6,095,099 A 8/2000 Morohoshi et al.
6,134,878 A * 10/2000 Amako et al. ................ 60/801
6,181,019 B1 1/2001 Frank
6,310,404 B1 10/2001 Frank
6,313,543 B1 11/2001 Frank
6,376,944 B1 4/2002 Grizzle, Jr. et al.
6,431,126 B2 8/2002 Saito
6,492,740 B2 12/2002 Suzuki
6,499,441 B2 12/2002 Suzuki
6,568,355 B2 5/2003 Suzuki

* cited by examiner

GENERATOR INCLUDING VERTICALLY SHAFTED ENGINE

FIELD OF THE INVENTION

The invention relates to electrical generators and more particularly to vertical shaft electric generators.

BACKGROUND

Generators are known for supplying electrical power in remote locations, locations where access to standard utility power is unavailable, or in emergency situations when standard utility power to an area may be temporarily out of service. Many generators include an internal combustion engine that rotatably drives an alternator having a stator and a rotor. The rotor is coupled to the output shaft of the engine. Operation of the engine rotates the rotor, thereby inducing an electrical current in a set of wire coils. The electrical current can then be filtered to have characteristics similar to the electrical current supplied by standard utilities. The output generator current can be used to operate substantially any type of electrical device that would normally be operated by standard utility power.

Generators are available in many different configurations, and utilize many different types and sizes of engines, depending generally upon the amount of electrical power the generator is designed to provide. Some generators are portable and include a fuel tank, for supplying fuel to the internal combustion engine, and a frame for supporting the engine, the alternator, and the fuel tank. Some frames include wheels to facilitate movement of the generator. Other generators are standby units that are permanently mounted near a home, business or other structure.

SUMMARY

In one embodiment, the present invention provides a generator positionable on a support surface and including a frame, a one-piece mounting member, an internal combustion engine, an electrical energy source, a fuel supply, and an output unit. The one-piece mounting member is coupled to the frame and has a central portion, a first side, a second side, and a plurality of mounting arms extending from the central portion. Each mounting arm includes a frame mount, an engine mount, and a source mount. The internal combustion engine is coupled to the first side of the mounting member and includes an output shaft that extends through the central portion and is substantially normal to the support surface during generator operation. The electrical energy source has a rotor coupled to the output shaft for rotation therewith, and a stator coupled to the second side of the mounting member. The fuel supply supplies fuel to the engine, and the output unit communicates with at least one of the engine and the energy source.

Other features of the invention will become apparent to those skilled in the art upon review of the following detailed description, claims, and drawings.

Figure 1:
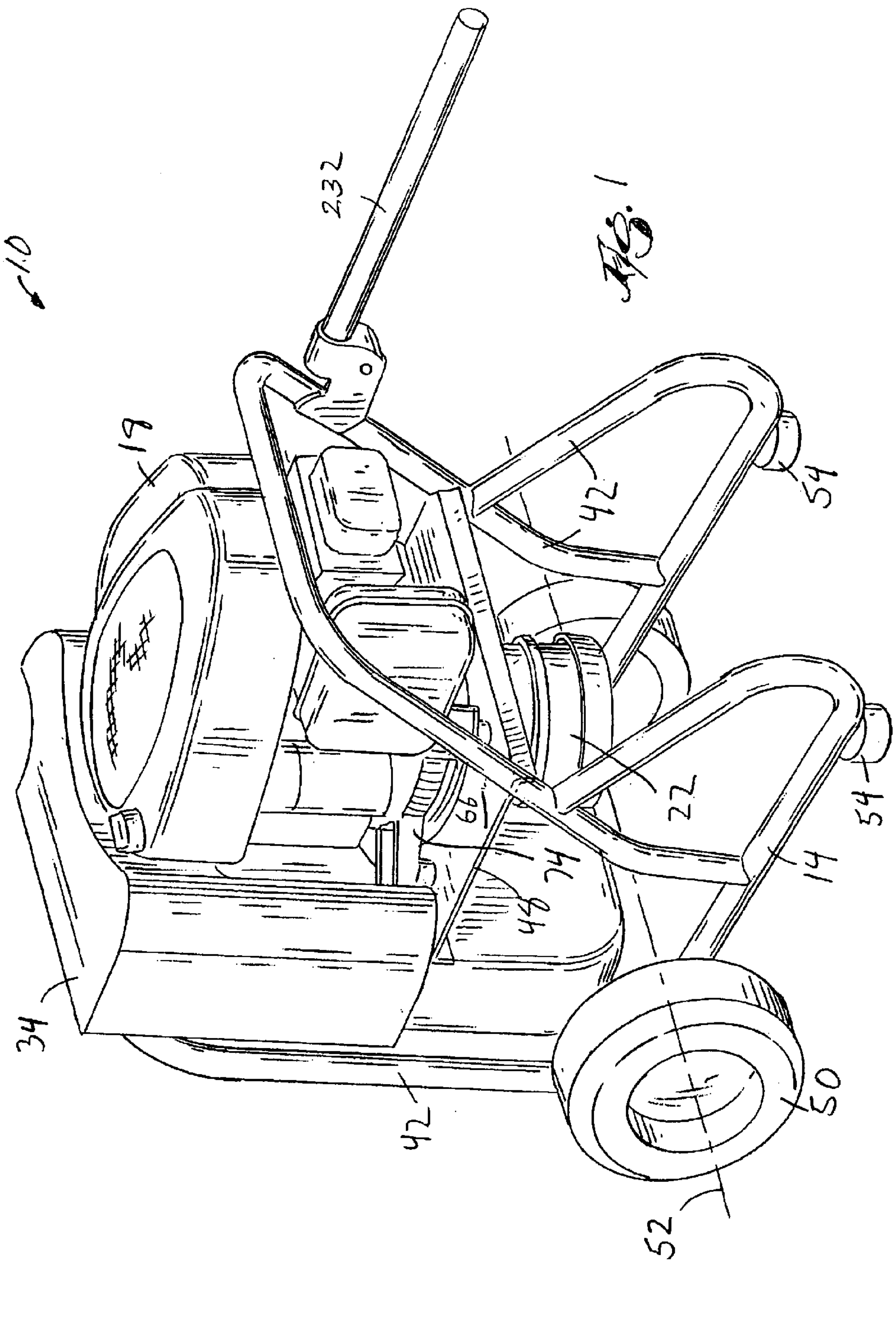
FIG. 1 is a perspective view of a portable generator embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

The Figures illustrate a vertically shafted generator 10 embodying the invention. With reference to FIGS. 1–5, the generator 10 includes a frame 14, an internal combustion engine 18 mounted to the frame 14, an electrical energy source or alternator 22 coupled to the engine 18 and to the frame 14, and a fuel tank 34 coupled to the frame 14. The illustrated engine 18 is a single-cylinder engine having an output shaft 38 that is substantially vertical during normal engine operation. A multi-cylinder engine (e.g. a V-twin engine) can also be used. The engine operates in a known manner to rotate the output shaft 38 at a speed that can vary depending upon the particular configuration of the generator 10. The preferred engine speeds are generally about 3,600 rpm (60 Hz) for use in the United States, and about 3,000 rpm (50 Hz) for use in Europe.

Figure 2:
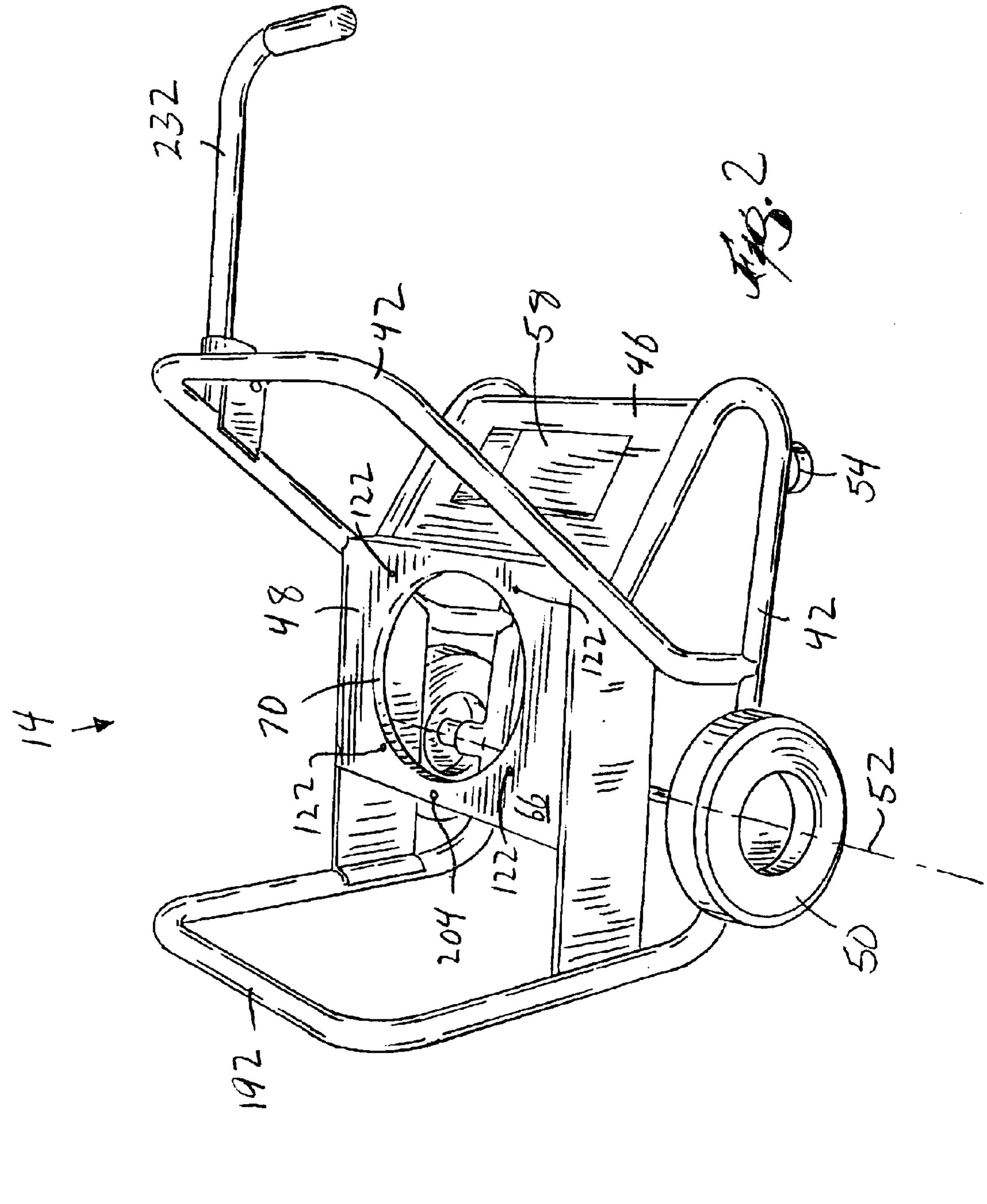
FIG. 2 is a perspective view of a frame for the portable generator of FIG. 1.

The frame 14 can be of substantially any construction. As illustrated in FIG. 2, the frame 14 includes a weldment of steel tubing 42 and steel plates 46, 48. The steel tubing 42 is bent as required and welded, along with the steel plates 46, 48, to complete the frame 14. Wheels 50 are rotatably mounted to the steel tubing 42 for rotation about a rolling axis 52 and engage a support surface (e.g. the ground) such that the generator 10 can be more easily moved. Resilient pads 54 can also be mounted to the tubing 42 for engagement with the ground when the generator 10 is operating. In the embodiment illustrated in FIGS. 2 and 4, one steel plate 46 defines a battery receptacle 58 for containing a battery 62 near a forward portion of the generator 10. The battery 62 can be electrically coupled to the engine 18 to provide electrical power for automatic engine starting in a known manner. In the alternative, a recoil pull starter could be used. The other steel plate 48 provides a mounting surface 66 and defines a central opening 70 that receives the alternator 22.

Figure 7:
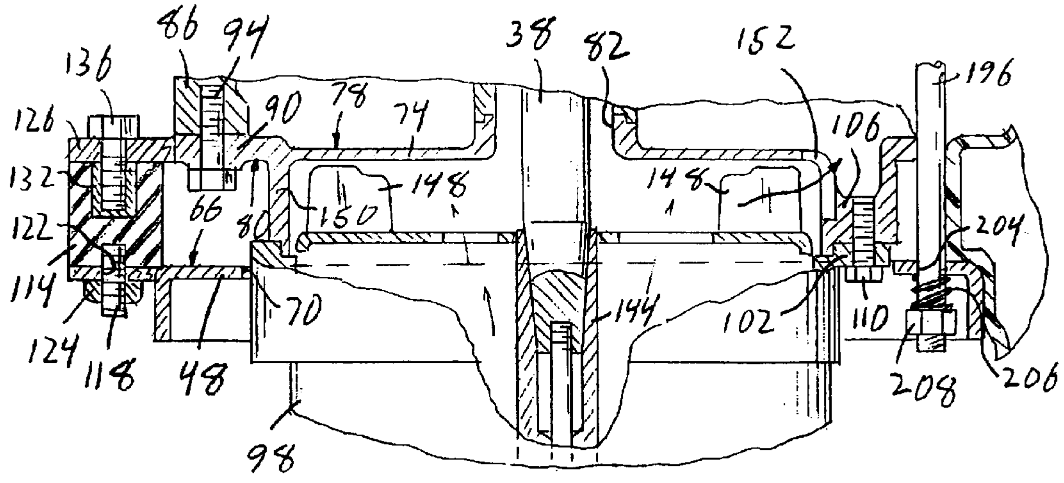
FIG. 7 is an enlarged section view of a portion of the portable generator of FIG. 1.
Figure 6:
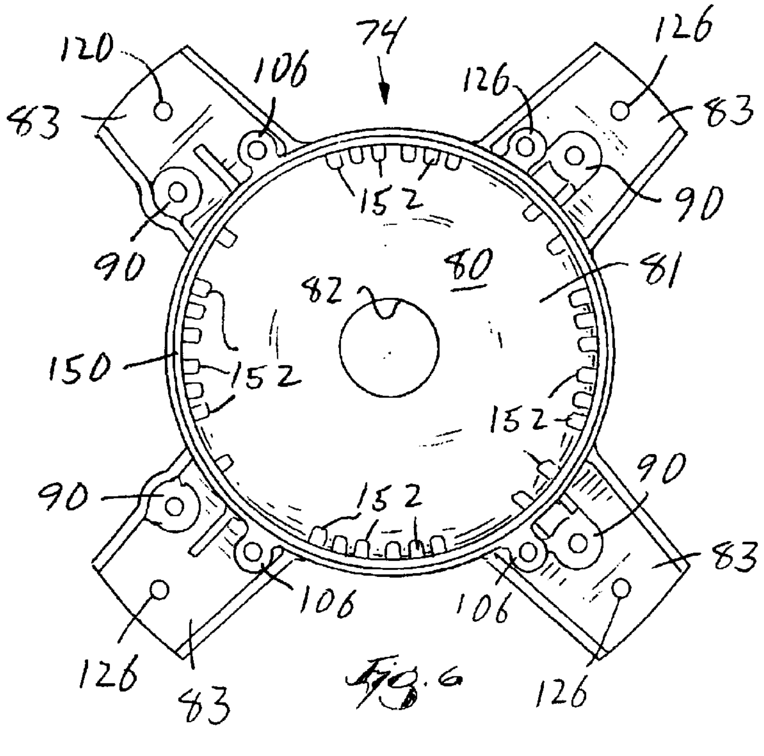
FIG. 6 is a top view of a mounting adapter for the portable generator of FIG. 1.

With reference also to FIGS. 6 and 7, a one-piece mounting member or interface 74 couples the alternator 22 and the engine 18 to each other. The mounting member 74 includes a first side 78 coupled to the engine 18, a second side 80 coupled to the alternator 22, a central portion 81 that defines a central aperture 82 through which the output shaft 38 extends, and a plurality of mounting arms 83 extending radially from the central portion 81. The specific configuration of the mounting member 74 is largely determined by the specific engine 18 and alternator 22 that are to be coupled together. In the illustrated embodiment, the engine 18 includes four mounting points 86 that are circumferentially spaced about the output shaft 38 in a pre-determined manner. The first side 78 of the mounting member 74 includes four corresponding engine mounts 90 defined by the mounting arms 83. The engine mounts 90 are circumferentially spaced about the central aperture 82 in the same manner as the mounting points 86.

To couple the engine 18 to the mounting member 74, the first side 78 is mated with the mounting points 86, and engine fasteners 94 are extended through the engine mounts 90 and threaded into the mounting points 86.

Similarly, the alternator 22 includes a housing 98 having four mounting points 102 that are circumferentially spaced in a predetermined manner. The second side 80 of the mounting member 74 includes four corresponding source mounts 106 defined by the mounting arms 83. The source mounts 106 are circumferentially spaced about the central aperture 82 in the same manner as the mounting points 102. To couple the alternator 22 to the mounting member 74, the second side 80 is mated with the housing 98 of the alternator 22, and source fasteners 110 are extended through the mounting points 102 and threaded into the source mounts 106. During manufacturing of the generator 10, the engine 18 and the alternator 22 are preferably coupled to one another via the mounting member 74, and the assembled engine 18, alternator 22, and mounting member 74 are then coupled to the frame assembly 14.

As mentioned above, the frame 14 includes a central opening 70 that receives the alternator 22. Specifically, the energy source is extended through the central opening 70 and the engine 18, alternator, 22, and mounting member 74 assembly are coupled to the frame by four isolator mounts 114 (see FIGS. 4, 5, and 7). Each isolator mount 114 includes a threaded boss 118 that extends through a respective mounting aperture 122 defined by the steel plate 48 and is secured to the steel plate 48 by a nut 124. The mounting apertures 122 are circumferentially spaced about the central opening 70 in a predetermined manner. The mounting member 74 includes corresponding frame mounts 126 defined by the mounting arms 83. The frame mounts 126 are circumferentially spaced about the central aperture 82 in the same manner as the mounting apertures 122. The isolator mounts 114 further include a threaded bore 132, such that a frame fastener 136 can be extended through the frame mounts 126 and threaded into the threaded bore 132.

The isolator mounts 114 can take on a variety of forms and function to separate the engine and alternator 22 from the frame 14. In some constructions, the isolator mounts 114 may be formed of a substantially rigid material (e.g. aluminum) such that relative movement of the engine 18 and alternator 22 with respect to the frame 14 is reduced. In other constructions, the mounts 114 may be formed of a relatively resilient material (e.g. a resilient polymer) that is selected to have stiffness and resonance characteristics such that vibrations induced by engine 18 and alternator 22 operation are substantially isolated from the frame 14, thereby reducing vibration of the frame 14, and lowering generator assembly noise levels during operation.

Figure 4:
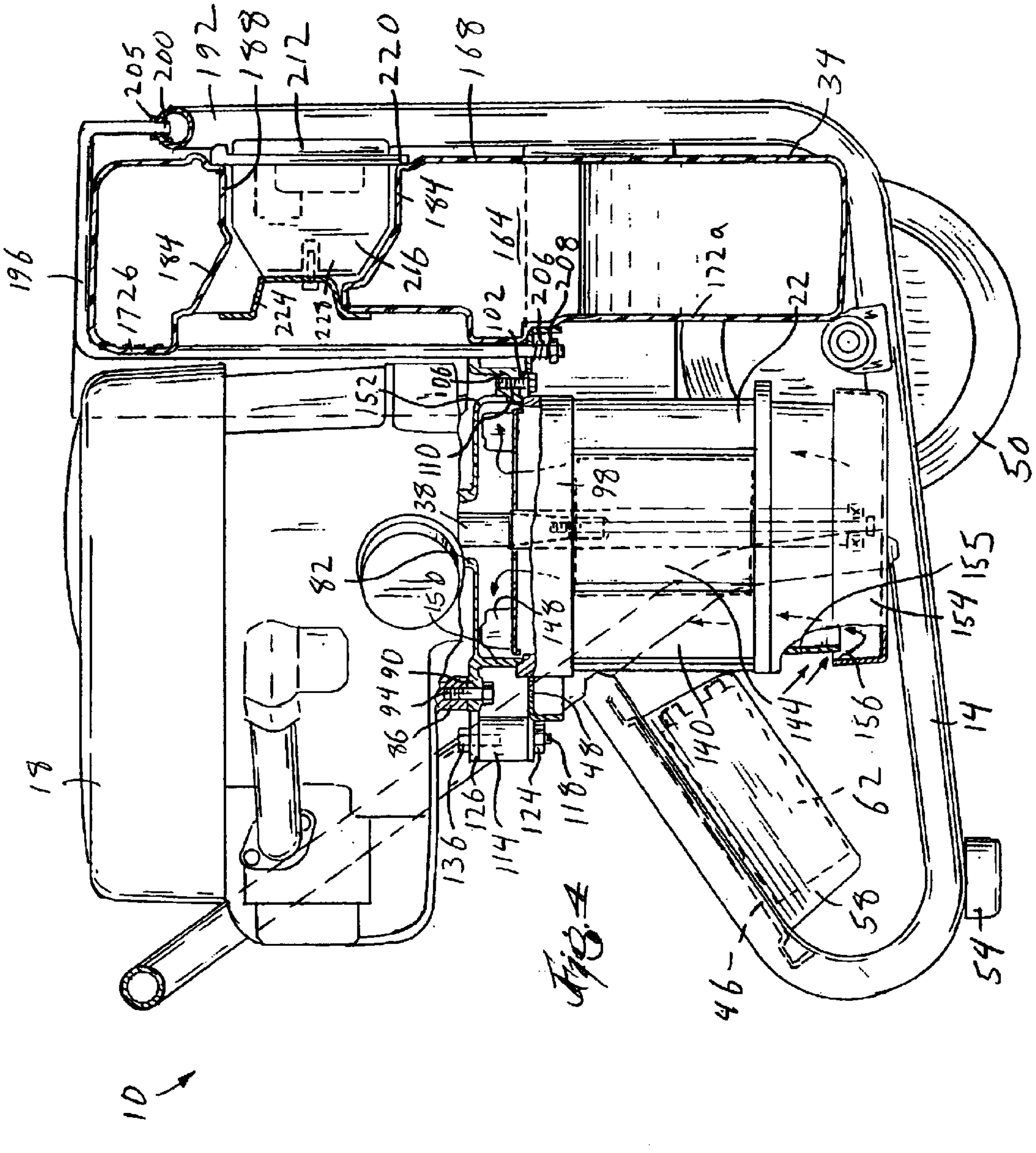
FIG. 4 is a partial section view taken along line 4—4 of FIG. 3.

Referring to FIG. 4, the illustrated alternator 22 further includes a generally annular stator 140 supported by the housing 98, and a rotor 144, disposed radially inward of the stator 140 and coupled to the output shaft 38. The stator 140 includes a plurality of wire coils or other electrical conductors. Rotation of the rotor 144 generates electric current in the stator 140 in a known manner. It should be appreciated that the relative positions of the stator and the rotor can be reversed, such that the rotor is generally annular and the stator is disposed radially inward of the rotor.

Referring to FIGS. 4 and 7, the alternator 22 further includes a fan 148 coupled to the rotor 144 for rotation therewith. The fan 148 is positioned between the alternator 22 and the engine 18 and is generally surrounded by the central portion 81 of the mounting member 74. Specifically, a circumferential wall 150 of the mounting member 74 surrounds the fan 148 and defines a plurality of airflow openings 152. An end cover 154 is coupled to and partially receives a rear bearing carrier 155 that defines the bottom portion of the alternator 22. The end cover 154 includes an outer diameter that is larger than an outer diameter of the rear bearing carrier 155, such that an upwardly opening annular air inlet 156 is defined between the rear bearing carrier 155 and the end cover 154.

During generator operation, air is drawn generally downwardly through the air inlet 156, around the rear bearing carrier 155, upwardly through the alternator 22, and out the air flow openings 152 in the mounting member 74 (see arrows in FIGS. 4 and 7). Drawing cooling air into the alternator 22 in this manner reduces the amount of dust, dirt, and debris drawn through the alternator 22 in comparison to drawing cooling air into the alternator 22 directly from the bottom of the end cover 154 through the rear bearing carrier 155.

Figure 3:
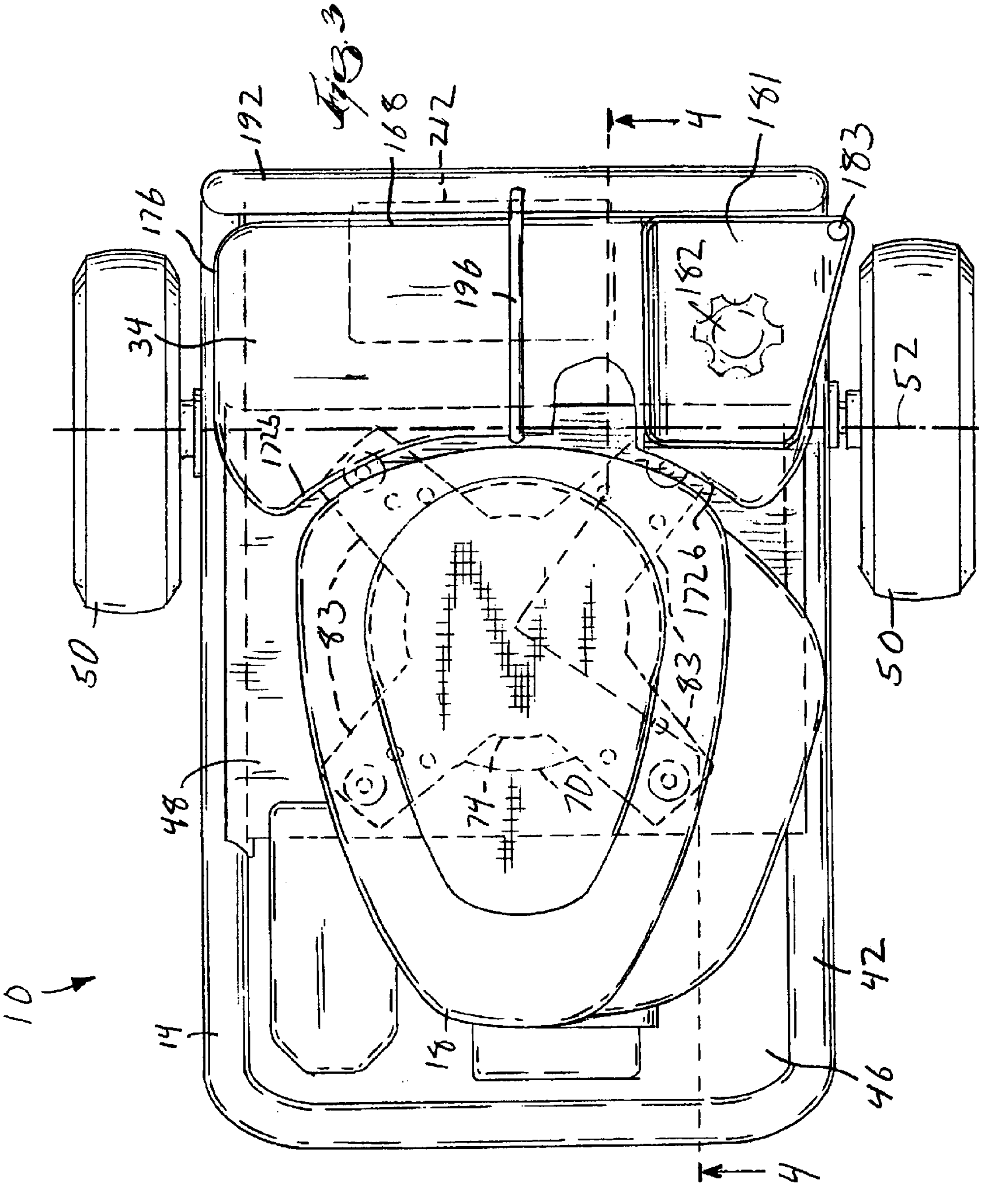
FIG. 3 is a top view of the portable generator of FIG. 1.
Figure 5:
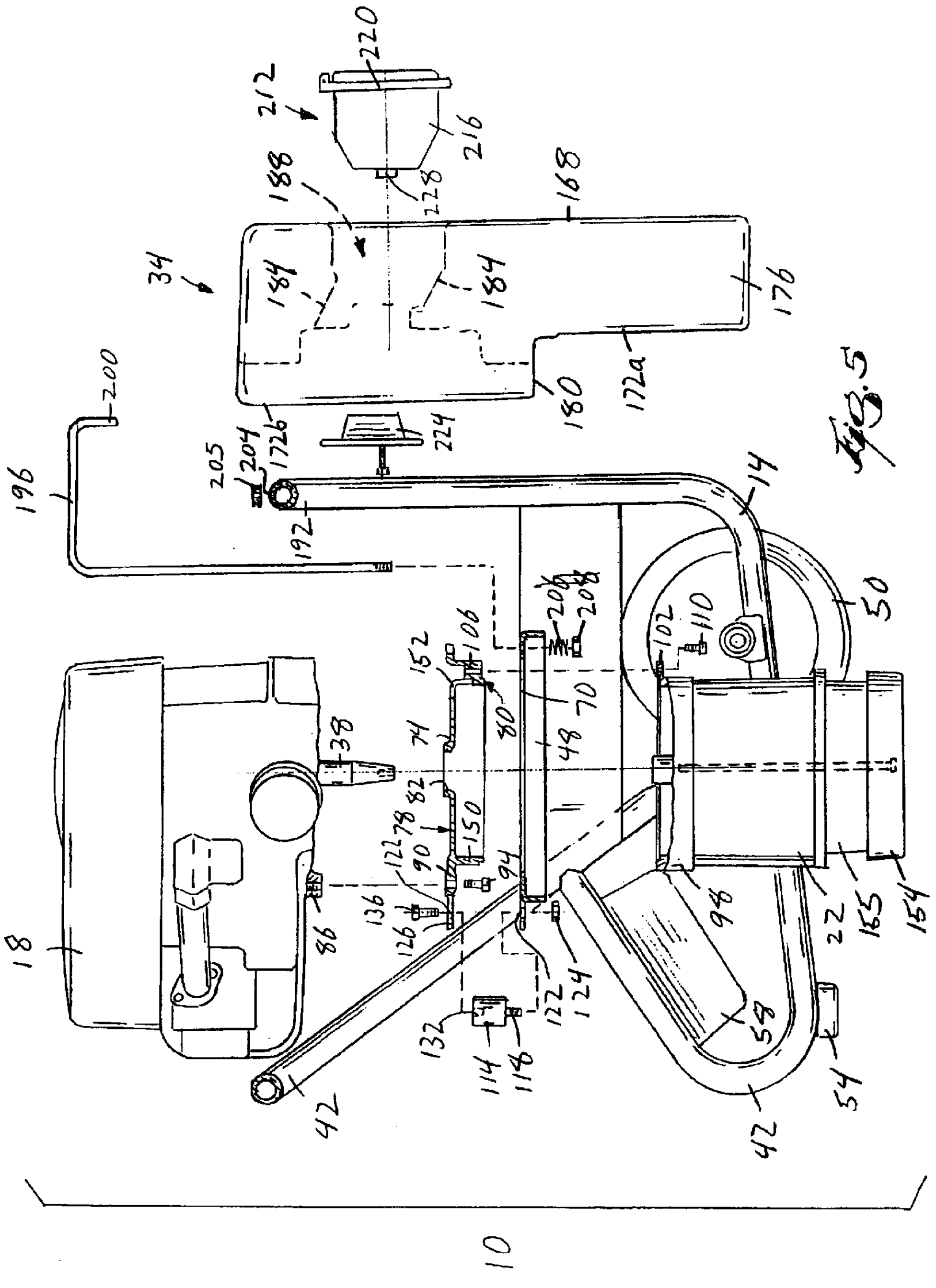
FIG. 5 is an exploded view of the portable generator of FIG. 1.

Referring also to FIGS. 4 and 5, the fuel tank 34 defines a fuel chamber 164 for storing fuel, which is delivered to the engine 18 during generator 10 operation. The fuel tank 34 is coupled to and supported by the frame 14 and includes a substantially planar first wall 168, a second wall 172 having a substantially planar lower portion **172*a* and an arcuate upper portion 172*b*, and sidewalls 176 extending between the first and second walls 168, 172. A pair of generally triangularly shaped walls 180 extends generally horizontally between the lower portion 172*a* and the upper portion 172*b* of the second wall. The fuel tank 34 is also provided with a fuel splash guard 181 (FIG. 3). The splash guard 181 generally surrounds a fuel cap 182 and includes a drain tube 183 that extends toward the ground. The splash guard 181 is provided to prevent (or at least reduce) fuel spilled during filling of the fuel tank 34** from contacting hot engine components.

The illustrated fuel tank 34 also includes opening walls 184 that extend between the first wall 168 and the upper portion **172*b* of the second wall, and that are generally surrounded by the fuel chamber 164 and the sidewalls 176. The opening walls 184 define an opening 188 that extends through the fuel tank 34 from the first wall 168 to the upper portion 172*b* of the second wall. In other constructions however, the first and second walls 168, 172 may be substantially continuous and the opening 188** may be eliminated.

The fuel tank 34 is mounted to the frame 14 such that a majority of the fuel chamber 164 is positioned on an opposite side of the rolling axis 52 as the engine 18 and the alternator 22. In this regard, the weight of the liquid fuel stored in the fuel chamber 164 counterbalances the weight of the engine 18 and alternator 22 to facilitate movement of the generator 10.

The frame 14 includes an upwardly extending U-shaped tube member 192 and the fuel tank 34 is received between and supported by the tube member 192 and the steel plate 48. Specifically, portions of the fuel tank 34 rest upon the mounting surface 66, and a generally J-shaped support rod 196 extends upwardly from the mounting surface 66 along the second wall 172*b*, over the top sidewall 176, and downwardly along the first wall 168 of the fuel tank 34. The end 200 of the support rod 196 is received in an aperture 204 defined in the tube member 192. A grommet 205 can be positioned in the aperture 204. The support rod 196 is supported by the steel plate 48 and the tube member 192 and snugly engages the fuel tank 34 for support thereof. The support rod 196 extends through the steel plate 48 and through a spring 206. A nut 208 compresses the spring 206 against the steel plate 48 to resiliently bias the support rod 196 into engagement with the fuel tank 34. As illustrated, the single support rod 196 is generally centered with respect to the wheels 50, however additional support rods can also be provided and spaced from one another accordingly.

A generator output unit 212 is received in the fuel tank opening 188 and includes generator control switches and electrical output sockets. The specific configuration of switches and output sockets is generally dependent upon the specific engine 18 and alternator 22 as well as the intended use of the generator 10.

The output unit 212 includes a main body portion 216 including a flange 220 that engages the first wall 168. A mounting bracket 224 engages the opening walls 184 and is coupled to the main body portion 216. The mounting bracket 224 and the flange 220 are drawn toward one another and snugly engage the opening walls 184 and the first wall 168, respectively, such that the output unit 212 is coupled to and supported by the fuel tank 34. In this regard, the output unit 212 can be installed in the opening 188 prior to assembly of the fuel tank 34 in the frame 14. Of course the output unit 212 could also be coupled to and supported by the frame 14 if desired.

The main body portion 216 of the output unit 212 also includes an interface coupling portion 228. The coupling portion 228 includes various terminals, pin connectors, and the like that may be coupled to the engine 18 and/or the alternator 22 for control thereof and communication therewith. In some embodiments the coupling portion 228 can also include various mechanical linkages and couplings for actuation of control levers and the like that may be used to control the operation of the engine 18.

By positioning the output unit 212 within the opening 188 in the fuel tank 34, the overall size of the generator 10 can be reduced. In addition, the opening walls 184 increase the rigidity of the fuel tank 34 and reduce the occurrence of fuel tank deformation that can occur due to changes in temperature and pressure within the fuel tank 34.

Figure 8:
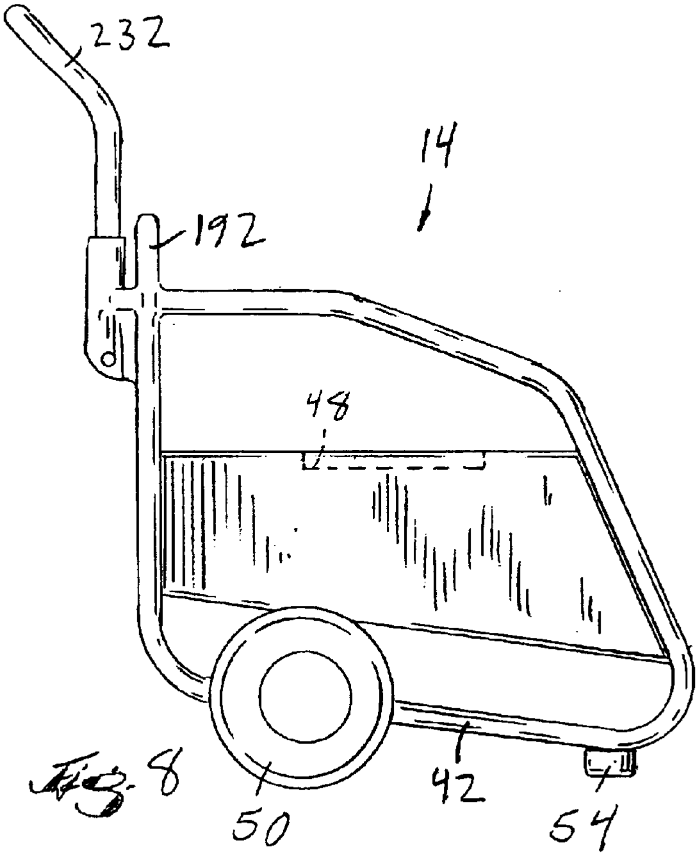
FIG. 8 is a side view of an alternative frame suitable for use with the portable generator of FIG. 1.
Figure 9:
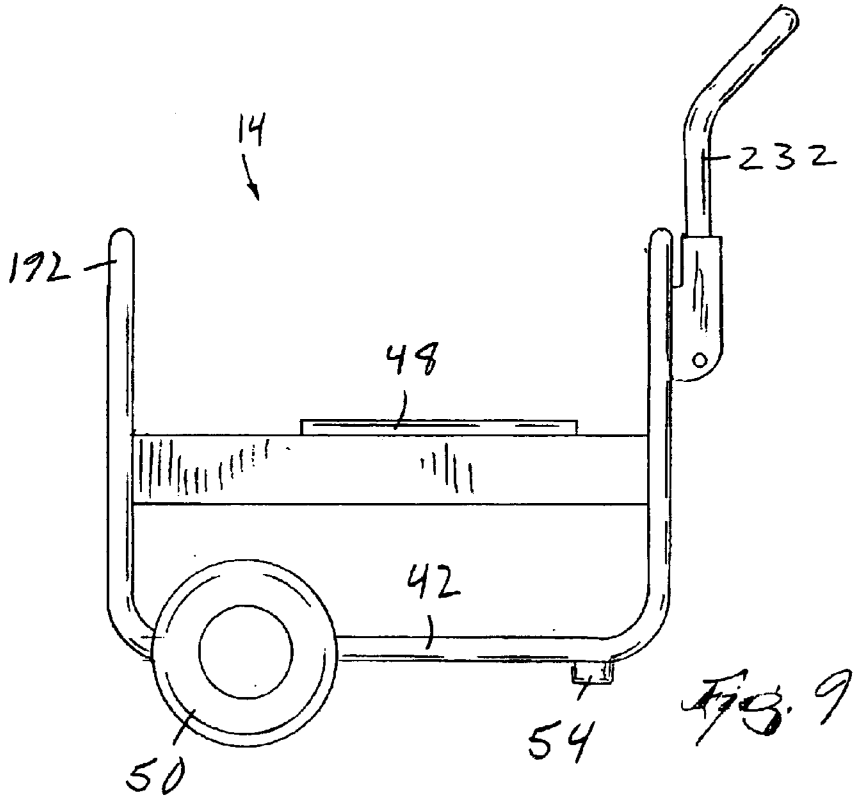
FIG. 9 is a side view of an additional alternative frame suitable for use with the portable generator of FIG. 1.

FIGS. 8 and 9 illustrate alternate embodiments of the invention wherein the specific configuration of the frame 14 has been modified. In some instances, it is desirable to provide several different frame configurations for product differentiation and marketing purposes. It should be appreciated that the frame 14 can take on a variety of shapes and the specific structure of the frame 14 is not limited.

As seen in FIGS. 1, 2, 8 and 9, a moveable handle 232 can be provided to facilitate moving the generator 10 by pivoting the frame 14 about the rolling axis, and subsequently rolling the entire generator 10 on the wheels 50. The handle 232 can be moved to a stowed position for storage or during operation of the generator 10.

Figure 10:
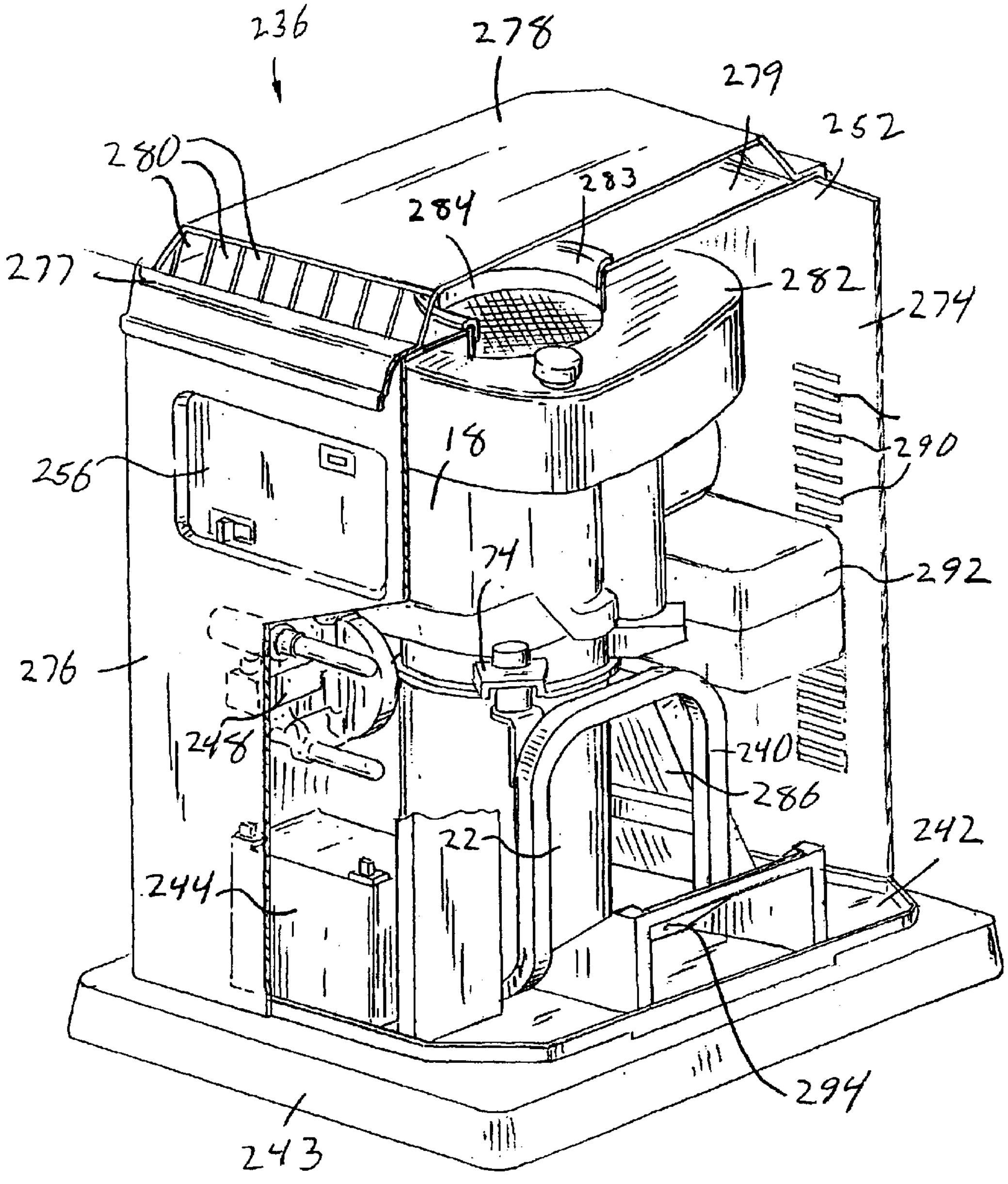
FIG. 10 is a perspective view of a standby power unit with portions cut away and including a generator embodying the invention.
Figure 11:
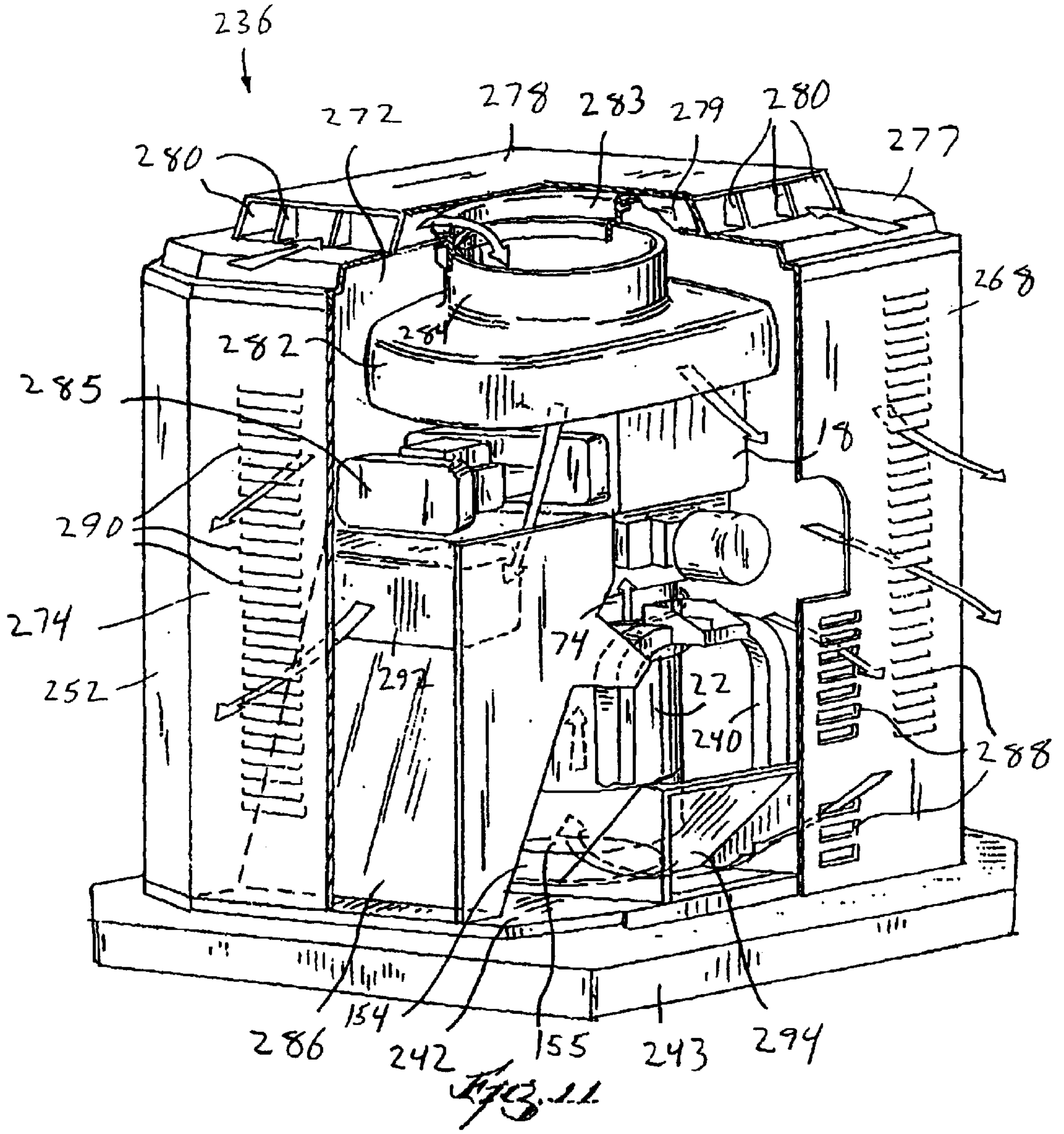
FIG. 11 is a perspective view of a standby power unit including a generator embodying the invention and illustrating air flow pathways through the standby power unit.

FIGS. 10 and 11 illustrate a standby power unit 236 that incorporates the engine 18, the mounting member 74, and the alternator 22 of the portable generator 10 described above. The power unit 236 can be configured to provide emergency electrical power to a home, business, or similar structure in the event of a power outage. The engine 18, mounting member 74, and alternator 22 are assembled as described above, and the mounting member 74 is isolatingly coupled to a frame 240. The frame 240 is coupled to a base plate 242, and the base plate 242 is coupled to a base pad 243. The base pad 243 is in turn resting on the ground. The power unit 236 includes a battery 244 that provides electrical power for starting the engine, and a fuel regulating assembly 248 that regulates the flow of fuel to the engine. In the illustrated embodiment, the engine is configured to operate using natural gas as fuel. As such, the fuel regulating assembly 248 is a natural gas regulator that is coupleable to a natural gas supply line (not shown). It should be appreciated however that the engine can be configured for use with other types of fuel including LP or propane gas, as well as liquid fuels, without limitation.

A housing 252 is provided to enclose the engine 18, the alternator 22, the battery 244, and the fuel regulating assembly 248. The housing 252 includes an output unit 256 including various switches and the like for operational control of the standby power unit 236. In some embodiments, the standby power unit 236 also includes an electrical sensor (not shown) that communicates with the main electrical supply line for the home, business, or other structure with which the standby power unit 236 is associated. If so equipped, the standby power unit 236 automatically starts in response to sensing an absence of electrical power in the main electrical supply line, thereby providing emergency electrical power for the home, business, or other structure with which it is associated. When power is restored, the unit 236 shuts itself off. In other embodiments, the standby power unit 236 may be manually started when a power outage occurs and manually stopped when power is restored. The transfer of power to the home or business from the unit 236 or the utility line can likewise be performed manually or automatically, depending upon the requirements of a particular application.

As best shown in FIG. 11, the housing 252 includes a series of manifolds or ducts (discussed below) that direct air flow through the housing 252 to provide intake and cooling air for the engine 18, and to provide intake and cooling air for the alternator 22.

The housing 252 includes a pair of sidewalls 268, 272 and a pair of endwalls 274, 276 extending between the sidewalls 268, 272 to define an enclosure for the generator 10. A cover 277 overlies the enclosure and includes an upper wall 278 and a lower wall 279. The lower wall 279 engages the sidewalls 268, 272 and the endwalls 274, 276. The upper wall 278 and the lower wall 279 cooperate to define a plurality of intake apertures 280 that communicate with an engine intake shroud 282. A sealing member 283 is coupled to an inlet ring 284 and engages the lower wall 279. The inlet ring 284 is in turn coupled to the intake shroud 282 such that air is guided from the intake apertures, between the upper and lower walls 278, 279 and into the engine shroud 282. Air that flows through the engine shroud 282 is used both to cool the engine 18 and as engine intake air for mixing with engine fuel in a carburetor (not shown) or other air/fuel mixing device.

Air flows over the engine 18 and in particular flows past the engine cylinder and cylinder head assembly 285 for cooling thereof. Some of the air is guided away from the engine and out of the housing 252 by an engine exhaust duct 286, while the remainder of the air flows out of the housing 252 via louvers 288 defined in the sidewalls 268, 272 and the endwall 274. The engine exhaust duct 286 communicates with a plurality of louvers 290 defined by the endwall 274, through which the air exits the housing 252.

The engine exhaust duct 286 also guides air over an engine exhaust assembly or muffler 292. The engine exhaust duct 286 defines an opening through which the muffler 292 extends such that air flowing toward the endwall 274 and out of the housing 252 passes over the muffler 292 for cooling thereof. In addition, the air flowing past the muffler 292 entrains the exhaust gasses that are expelled from the muffler 292 during engine operation such that the exhaust gasses are more efficiently removed from the housing 252.

A pair of alternator inlet manifolds 294 provides communication between some of the louvers 288 defined in the sidewalls 268, 272 and the bottom of the rear bearing carrier 155. As such, cooling air is drawn through the alternator inlet manifolds 294 and into the alternator 22 by the fan 148 during generator operation. The cooling air flows upwardly through the alternator 22, exits through the airflow openings 152 defined by the mounting member 74, and flows out of the housing 252 via some of the louvers 288 in the sidewalls 268, 272.

The engine shroud 282 and the engine exhaust duct 286 cooperate to define a first path for cooling air that primarily cools the engine 18. The alternator inlet manifolds 294, alternator end cover 154, and mounting member 74 cooperate to define a second path for cooling air that primarily cools the alternator 22. By providing two at least partially isolated flow paths through the housing 252, overall cooling is improved.

Various features of the invention are set forth in the following claims.

What is claimed is:

1. A generator positionable on a support surface, the generator comprising:

a frame;

a mounting member coupled to the frame and having a central portion defining a plurality of airflow openings, a first side, and a second side;

an internal combustion engine coupled to the first side of the mounting member and including an output shaft that extends through the central portion and is substantially normal to the support surface during generator operation;

an electrical energy source having a rotor coupled to the output shaft for rotation therewith, and a stator coupled to the second side of the mounting member, the stator defining an air inlet opening adjacent the support surface;

an enclosure having at least first and second sidewalls and a top wall that cooperate to surround the engine, the energy source, and the mounting member, the enclosure defining a first air flow path that guides air from the top wall toward the engine, and from the engine toward the first sidewall, and a second air flow path that guides air from the second sidewall toward the air inlet opening defined by the stator, and through the stator toward the airflow openings in the mounting member.

2. The generator of claim 1, wherein the enclosure includes an intake manifold extending between the top wall and an upper portion of the engine for guiding air from the air flow apertures in the top wall toward the engine during generator operation.

3. The generator of claim 1, wherein the enclosure includes an engine exhaust duct extending between the engine and one of the sidewalls for guiding air from the engine toward the one sidewall during generator operation.

4. The generator of claim 3, wherein the engine includes a muffler positioned at least partially within the engine exhaust duct, and wherein air flowing away from the engine toward the first sidewall flows over the muffler.

5. The generator of claim 1, wherein the enclosure includes a source inlet manifold extending between the second sidewall and the air inlet opening for guiding air toward the air inlet opening during generator operation.

* * * * *